United States Patent [19]

Wortman

[11] Patent Number: 4,600,875
[45] Date of Patent: Jul. 15, 1986

[54] POWER SUPPLIES WITH LATCH-UP PREVENTION AND AUTOMATIC BACK-UP

[75] Inventor: Donald W. Wortman, Central Islip, N.Y.

[73] Assignee: TII Corporation, Copiague, N.Y.

[21] Appl. No.: 493,349

[22] Filed: May 10, 1983

Related U.S. Application Data

[62] Division of Ser. No. 234,725, Feb. 17, 1981, Pat. No. 4,392,225.

[51] Int. Cl.[4] ............................ G05F 5/00; H02J 7/00
[52] U.S. Cl. .................................... 323/303; 323/282; 363/89; 307/65
[58] Field of Search ............... 323/282, 283, 284, 271, 323/299, 300, 303, 351; 363/18, 19, 20, 21, 80, 89, 97, 124; 307/266, 240, 64, 85, 86, 65; 179/70, 77

[56] References Cited

U.S. PATENT DOCUMENTS

| | | | |
|---|---|---|---|
| 3,588,675 | 6/1971 | Suzuki | 323/303 |
| 3,717,793 | 2/1973 | Peterson | 361/104 |
| 3,733,540 | 5/1973 | Hawkins | 363/89 |
| 3,748,500 | 7/1973 | Tam | 307/65 |
| 4,096,394 | 6/1978 | Ullman et al. | 307/65 |
| 4,180,852 | 12/1979 | Koizumi et al. | 323/282 |
| 4,222,087 | 9/1980 | Goodrich | 361/104 |
| 4,315,305 | 2/1982 | Siemon | 323/300 |
| 4,464,709 | 8/1984 | Barter | 363/56 |

Primary Examiner—Patrick R. Salce
Assistant Examiner—Judson H. Jones
Attorney, Agent, or Firm—Hughes & Cassidy

[57] ABSTRACT

A subscriber power supply which delivers sufficient power to a subscriber terminal load despite variations in load current due to changes in the number of channels in a telephone carrier system. The power supply also has a back-up unit which operates to deliver power to the load in the event that a fault occurs in the primary supply.

8 Claims, 1 Drawing Figure

POWER SUPPLIES WITH LATCH-UP PREVENTION AND AUTOMATIC BACK-UP

This is a division of application Ser. No. 234,725, filed Feb. 17, 1981, now U.S. Pat. No. 4,392,225.

FIELD OF INVENTION

This invention relates to power supplies for telephone carrier systems.

OBJECTS OF INVENTION

An object of this invention is to provide a novel power supply for subscriber terminal equipment in a telephone carrier system, which power supply, among other things, is characterized by a redundant power supply circuit which automatically comes into operation in the event the primary power supply fails.

Further objects of this invention will appear as the described proceeds in connection with the below-described drawings and appended claims.

FIG. 1 is a circuit diagram of a redundant power supply incorporating additional principles of this invention.

DETAILED DESCRIPTION

Figure 1:
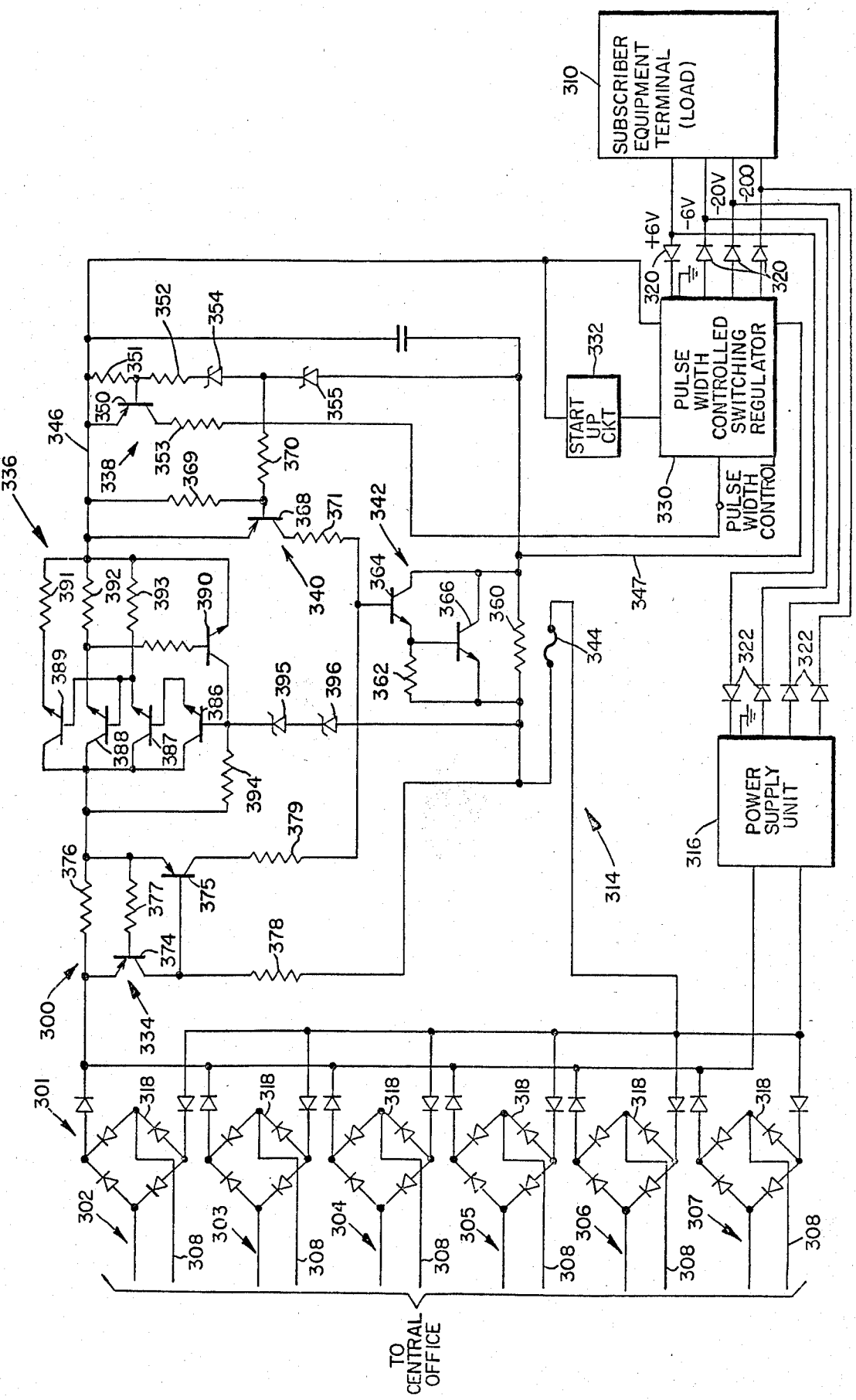

In FIG. 1, a subscriber power supply 300 is shown for a 48 channel subscriber carrier system 301 containing six frequency division multiplexed sub-systems of eight channels each. The subsystems are indicated at 302, 303, 304, 305, 306 and 307. The general arrangement of the 48 channel system 301 may be of the type described in U.S. Pat. No. 4,087,639. Each carrier sub-system 302-307 may be the same as that shown in FIG. 1 of parent application Ser. No. 234,725 and has its own two-conductor transmission line 308 for interconnecting the central office channel terminal equipment (not shown in FIG. 1) and the subscriber channel terminal equipment. According to this embodiment all 48 channels of the subscriber terminal equipment are located at a single terminal 310 and represents the load which is powered by the power supply 300.

Although illustrated for a 48 channel system having six transmission lines, the subscriber power supply is especially designed for use with anywhere from two eight-channel carrier systems up to and including six eight-channel systems. Loop resistance may be up 2400 ohms on each two-conductor transmission line with a remote (subscriber) terminal voltage of from +135 VDC to +270 VDC across each pair of transmission line conductors. Maximum direct current per conductor pair may be 100 ma. Operating power for the remote subscriber power supply is drawn from power supplies in the central office terminal equipmemt, there being one such central office power supply connected to each transmission line in system 301.

With the foregoing type of carrier system, it is advantageous to use a pulse width modulated switching regulator type of d.c to d.c. converter (as indicated at 330 in FIG. 1). This type of converter maintains a constant input power which is equal to the output power demanded of it times the efficiency. If the input voltage drops, then the input current must increase to keep the input power constant. The increase in input current through the input resistance of the cable pairs, however, causes an additional voltage drop. This condition can easily continue if output filter capacitors are used, as is the normal practice, due to the charge current needed to bring the filter capacitors up to operating voltage. It will be appreciated that the foregoing condition can progress to a state having an input voltage near zero and a very large input current with a large power loss in series with the input resistance. The end result is that insufficient power will be delivered to the load.

To prevent such a latch-up, an input current sensor is usually used to reduce the power drawn from the input line when the current reaches a predetermined level approaching the normal full load current. However, if the normal full load current varies considerably (as is the case when only two carrier sub-systems are being utilized instead of all eight carrier sub-systems), no current limit point can be found to prevent the latch-up or a reduction in output capability.

To overcome this problem, a voltage sensor 338 is used to reduce the pulse width and thus the input power requirements to the swtching regulator 330 when the input voltage drops below the half voltage point which is the maximum power transfer point. In this embodiment the half voltage point is 127 VDC. This pulse width reducing action limits the input current in the illustrated embodiment to a value equal to 135 volts divided by the input line resistance, allowing for losses across a voltage regulator-current limiter 336 (to be described later on) which is normally inactive.

Another problem in carrier systems is the interruption of service to customers due to a fault or component failure in the subscriber power supply. In this respect it is important that no single fault or component failure be allowed to affect more than a few customers. In a 48 channel carrier system, such as the one described above, the loss of eight channels may be tolerated, but no more. But where a single subscriber power supply is used for all 48 channels, as is the case in this example, a fault or component failure will affect an unacceptably large number of customers. To avoid this problem the power supply of this invention, which provides subscriber power to all 48 channels, is provided with a stand-by or back-up unit which automatically comes into operation in case of failure of any component in the primary supply.

Still referring to FIG. 1, power supply 300 comprises a pair of supply units or circuits 314 and 316, one acting as the backup for the other to provide the desired redundancy. Units 314 and 316 are connected in parallel, having their inputs connected through diode steering bridges 318 to the subscriber ends of transmission lines 308, and their outputs connected to the subscriber equipment terminal 310. The outputs of supply units 314 and 316 may be OR'ed together by diodes 320 and 322. Since supply units 314 and 316 are preferably of the same design, a description of the former will suffice for the latter.

As shown in FIG. 1, power supply unit 314 comprises the pulse width controlled switching regulator (also called a pulse width modulating switching regulator) 330, a conventional start-up circuit 332 for switching regulator 330, a line current sensor 334, the current limiter/voltage regulator 336, the voltage sensor 338, a further voltage sensor 340, a transistor switch 342 and a thermal sensitive disconnect fuse 344. Switching regulator 330 is connected ot the subscriber terminal load 310 to power the subscriber terminal equipment. Reference is made to U.S. Pat. No. 4,027,224 for a general description of the type of regulator used in this invention. Regulator 330 may be of a conventional circuit having a pulse width control point or mode, one suitable design being the SHQ-15OW by Power-One, Incorporated.

In regulator 330, direct current (which is conducted by transmission lines 308 from the central office) at one voltage is converted into direct current at a lower voltage by applying relatively high voltage pulses through an unshown transformer or inductor to periodically charge a capacitor (not shown) in the switching regulator to a lower voltage. The regulating portion of the regulator is effective to regulate the duration or width of each charging pulse in such a manner that the charge stored in the capacitor is normally just enough to restore the voltage across the capacitor to the lower voltage mentioned above. Switching regulator 330 is designed to power a maximum load (i.e., the subscriber terminal equipment for six eight-channel carrier systems in this embodiment). The load driven by switching regulator 330 will reduce, however, for applications where fewer than all six carrier systems are utilized, thus creating a problem of starting up the switching regulator.

To overcome this problem and to insure that switching regulator 330 (which is a constant power load) can start up under load with a reasonable resistance in series with the source voltage, voltage sensor 338 is connected to the pulse width control input of regulator 330 in the manner shown to prevent the line voltage across the conductors 346 and 347 from dropping below a preselected value, which in this embodiment is selected to be the half-power point of 135 volts. To accomplish this, voltage sensor 338 comprises a PNP transistor 350, resistors 351, 352, and 353, a 6.8 volt zener diode 354 and a 120 volt zener diode 355, all connected in the manner shown in FIG. 6. The collector-emitter path of transistor 350 is connected between conductor 346 and the regulator's pulse width control input so that when transistor 350 is turned on, line current will be conducted to the regulator's pulse width control input.

Transistor 350 is held in conduction as long as the line voltage across conductors 346 and 347 exceeds the sum of the zener voltages of zener diodes 354 and 355, which sum is approximately 127 volts in this embodiment. If the line voltage drops below 127 volts, however, transistor 350 will no longer be supplied with bias current because of diodes 354 and 355. As a result, transistor 350 will turn off. When this happens, the regulating or pulse width control portion of switching regulator 330 will reduce the switching regulator's on-time pulse width, thus reducing the input current which is drawn from the line 346, 347. The line voltage across conductors 346, 347 will therefore rise until conduction of transistor 350 is re-established somewhere between cutoff and saturation.

The voltage sensor 338 (which comprises transistor 350) thus senses a drop in the d.c. line voltage across conductors 346 and 347 below a pre-selected value (127 volts in this embodiment) and in response to sensing such a voltage drop, sensor 338 causes regulator 330 to reduce the pulse width and thus the amount of current that the switching regulator can draw. This action in turn increases the line voltage to a value where transistor 350 again conducts.

With the reduced pulse width, the unshown capacitor in switching regulator 330 will charge up to the desired voltage, but at a slower rate because of the reduction in the switching regulator's demand for charging current. When the unshown capacitor in switching regulator 330 becomes fully charged, the voltage across regulator 330 will come up to the normal operating value (e.g., between 140 volts and 270 volts), thus cutting off the pulse width-reducing action of voltage sensor 338. In this manner switching regulator 330 is capable of starting up under a wide range of subscriber terminal loads and under long line and low input current conditions.

With continued reference to FIG. 1, fuse 344 and a resistor 360 of relatively small size (e.g., 300 ohms) are connected in series in conductor 347 and hence in series with the line current. Resistor 360 provides the heat for operating the thermal sensitive fuse 344. For this purpose, fuse 344 is preferably mounted in direct contact with resistor 360. The contacting surfaces of fuse 344 and resistor 360 may be flat. Fuse 344 may also be advantageously mounted in contact with a common heat sink for transistors 366, 388 and 389 so that overheating of any one of these transistors will cause the fuse to open. As shown, transistor 366 forms a part of transistor switch 342, and transistors 387 and 388 form a part of the current limiter/voltage regulator 336. Switch 342 is normally conditioned to keep transistor 366 biased on to effectively short circuit resistor 360.

Switch 342 will respond to the concomitant occurrence of two conditions (to be described shortly) to open the circuit through transistor 366 and to thereby cause all of the line current to pass through resistor 360. When this happens, sufficient heat is generated by resistor 360 to cause fuse 344 to fail. Failure of fuse 344 disconnects the power supply unit 314 from the line by opening the circuit which conducts operating current to switching regulator 330.

To accomplish the foregoing functions, switch 342 may be of any suitable design and is shown to comprise transistor 366 and a further NPN transistor 364. Transistors 364 and 366 are connected in the manner shown in FIG. 1, whereby when transistor 364 is conducting it will keep transistor 366 in conduction, but when transistor 364 is turned off, transistor 366 will also turn off. When transistor 364 and 366 are conducting, transistor 366 will conduct most of the current around resistor 360 because of its collector-emitter saturation voltage of 1 to 2 volts. When transistors 364 and 366 are turned off, the circuit for conducting line current through transistor 366 and around resistor 360 will open, thus causing all of the line current to be conducted through resistor 360.

Bias current for maintaining transistor 364 in conduction is supplied from two sources, namely voltage sensor 340 and current sensor 334. Transistor 364 is kept in its conducting state when bias current is supplied from either one or both of these sources, but when the biasing currents from both of these sources are concomitantly interrupted, transistor 364 will turn off. Resistor 362 is of relatively large size (e.g., 1 Kohm) to insure that transistor 366 will turn off when both of the above-mentioned bias current sources are removed.

Voltage sensor 340 comprises an NPN transistor 368, resistors 369, 370 and 371 and zener diode 355, all connected to the manner shown in FIG. 1.

The collector-emitter path of transistor 368 is connected between conductor 346 and the base of transistor 364 to conduct bias current to transistor 364. Bias current for keeping transistor 368 in its conducting state is conducted by zener diode 355. With these circuit connections it will be appreciated that when the line voltage across conductors 346 and 347 drops below the 120 volt zener voltage of zener diode 355, zener diode 355 will interrupt the supply of bias current for transistor 368, thus causing transistor 368 to turn off and thus interrupting the supply of biasing current to transistor 364 by way of transistor 368.

Current sensor 334 comprises a pair of PNP transistors 374 and 375 and resistors 376, 377, 378 and 379 all connected in the manner shown in FIG. 1. Resistor 376 is connected in conductor 346 in series with the line current, so that the voltage drop across resistor 376 varies with the magnitude of line current. As such, resistor 376 senses the magnitude of line current being drawn by switching regulator 330. Resistor 376 is connected to transistor 374 to provide the base bias voltage for transistor 374.

The collector-emitter path of transistor 375 is connected between conductor 346 and the base of transistor 364 so that when transistor 375 is in its conducting state, it supplies biasing current to transistor 364. Transistor 374 has its collector-emitter path connected across conductors 346 and 347 and additionally has its collector connected to the base of transistor 375, so that the base bias voltage for transistor 375 is the collector voltage of transistor 374.

As long as the line current through resistor 376 is less than a pre-selected amount (100 ma in this embodiment) the voltage drop across resistor 376 is insufficient to turn transistor 374 on. With transistor 374 in its non-conducting state, the collector voltage of transistor 374 will be sufficient to bias transistor 375 into conduction. In its conducting state, transistor 375 will supply the biasing current for keeping transistor 364 in its conducting state.

If the line current becomes greater than 100 ma, the voltage drop across resistor 376 increases sufficiently to bias transistor 374 into conduction. When this happens the collector voltage of transistor 374 is pulled down to a value that is insufficient to keep transistor 375 in its conducting state. Transistor 375 will therefore turn off to interrupt the supply of biasing current to transistor 364.

If a component failure in switching regulator 330 causes excessive current to be drawn by the switching regulator to such an extent that the line voltage across conductors 346 and 347 drops below 120 volts, zener diode 355 will terminate the supply of bias current to transistor 368. Transistor 368 therefore turns off to remove one of the two bias current sources for transistor 364. If the excessive line current drawn by switching regulator 330 exceeds 100 ma, then such condition is sensed by current sensor 334, causing transistor 375 to turn off to remove the second source of base bias for transistor 364. Thus, if both transistors 368 and 375 are concomitantly turned off by the foregoing conditions, then transistor 364 will turn off, causing transistor 366 to turn off to disconnect resistor 362. All of the line current will now be conducted by resistor 360.

Because of the current limiting action of the current limiter/voltage regulator 336, the voltage developed across resistor 360 will be between 30 volts and 60 volts for the illustrated embodiment causing resistor 360 to dissipate between 3 and 27 watts, which is sufficient to cause failure of fuse 344. Failure of fuse 344 completely and permanently disconnects the failed power supply unit (unit 314 in this example) from the line except for the steering diode bridges and line feed coils. Upon such a disconnection of supply unit 314, the second power supply unit 316 will start up and continue the supply of power to the subscriber terminal load, thus providing for the continued operation of the carrier system with only a short interruption.

The current limiter/voltage regulator 336 may be of any suitable design to protect the power supply from line voltage and current transients. In this embodiment the current limiter/voltage regulator 336 comprises NPN transistors 386, 387, 388, 389 and 390, resistors 391, 392, 393 and 394, a 150 volt zener diode 395 and a 100 volt zener diode 396, all connected in the manner shown in FIG. 6. Voltage transients will be limited by diodes 395 and 396 and current transients will be limited by operation of transistor 390, as is apparent from the illustrated circuitry.

By monitoring both line current (with current sensor 334) and line voltage (with voltage sensor 340) and by effecting disconnection of the power supply unit only upon the concomitent occurence of two conditions (i.e., line voltage dropping below 120 volts and line current exceeding 100 ma), the power supply described above is able to operate under an assortment of different normal operating conditions without blowing fuse 344. For example, more than 100 ma of line current will normally be drawn by switching regulator 330 initially upon start-up, but such a normal start-up condition will not result in the failure of fuse 344 because the line voltage will normally be greater than 120 volts because of voltage regulator 336. Furthermore, a line current in excess of 100 ma will normally be drawn when more than a preselected number of the carrier sub-systems (302–307) are actually used. For example, about 300 ma of line current will normally be drawn when all six of the carrier sub-systems 302–307 are used. The 100 ma minimum current required for removing the second source of bias current for transistor 364 prevents transistors 364, 366 from operating when insufficient power is available to resistor 360 to blow fuse 344. If less than 100 ma is available from the central office supply, the problem is elsewhere in the system.

The power is supplied from the central office terminal by a separate independent central office power supply for each of the transmission lines 308 in the overall system 301. With two tranmission lines powering a 16 channel system at less than 2000 ohms, a failure of one line supply will not cause a system failure, but only a reduction of the channel off-hook capability. With six transmissions powering a 48 channel system at 2400 ohms, a failure of one line supply will reduce the off-hook capability from about 40 to 35. Thus, full redundancy is effected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A d.c. power supply comprising a pair of terminals adapted to be connected to a d.c. source, means for converting the power supplied from said source to d.c. power of a lower voltage, a pulse width controlled switching regulator connected across said terminals for so converting the power supplied by said source into serially occurring pulses of variable width as to maintain constant switching regulator input power, said switching regulator having a pulse width controlling input to provide for the control of the widths of said pulses, and voltage sensing means connected intermediate one of said terminals and said pulse width control input and providing power to said input as long as the d.c. line voltage across said terminals remains above a pre-selected value, said voltage sensing means being independent of the voltage to which the power supplied from said d.c. power source is converted but responsive to a drop in said line voltage below said pre-selected value to completely remove the power from said input, and said switching regulator being responsive to the removal of power from said input to reduce the widths of said pulses and thereby limit the current drawn by said switching regulator, consequently reducing losses in the power available to the load supplied by said switching regulator while increasing the input voltage to said regulator to maintain the power available to the load at an established level.

2. A d.c. power supply comprising a pair of terminals adapted to be connected to a d.c. source, means for converting the power supplied from said power source to d.c. power of a lower voltage comprising a pair of power supply units interposed in parallel between a common load and said terminal pair, at least one of said power supply units including a pulse width controlled switching regulator connected across said terminals and thus across said source to be operated by the power supplied by said source, and means responsive to the concomitant occurrence of two pre-selected conditions other than fluctuations in said lower voltage for electrically disconnecting said regulator from said source, said two pre-selected conditions being: (a) a drop in the d.c. voltage developed across said terminals and applied to said regulator and (b) an increase in the direct current conducted by said terminals to said regulator, there being means providing for the connection of the outputs of said power supply units to said common load and enabling the other of said power supply units to deliver power to said common load when said one of said power supply units is electrically disconnected from said source, and the means for disconnecting said regulator from said d.c. power source comprising: a circuit means which can be actuated to interrupt the continuity of the connections between said d.c. source and said switching regulator, actuating means which is responsive to a flow of current therethrough to actuate said connection interrupting circuit means, a first means which can be operated to alter the flow of current through said actuating means as aforesaid by interrupting the flow of current thereto from two different sources, a second means which is operated to interrupt one of said flows of current to said first means upon said drop in d.c. voltage, and a third means which is operated to interrupt said second flow of current to said first means upon said increase in the flow of direct current to said regulator.

3. A d.c. power supply as defined in claim 1 wherein said voltage sensing means comprises: a transistor having its collector-emitter circuit interposed between said d.c. source and the input of said pulse width controlled switching regulator and a zener diode of the characteristics and so connected to said transistor as to interrupt the flow of current through its collector-emitter circuit when the d.c. line voltage drops below said pre-selected value.

4. A d.c. power supply comprising a pair of terminals adapted to be connected to a d.c. source, means for converting the power supplied from said power source to d.c. power of a lower voltage comprising a pair of power supply units interposed in parallel between a common load and said terminal pair, at least one of said power supply units including a pulse width controlled switching regulator connected across said terminals and thus across said source to be operated by the power supplied by said source, and means responsive to the concomitant occurrence of two pre-selected conditions other than fluctuations in said lower voltage for electrically disconnecting said regulator from said source, said two pre-selected conditions being: (a) a drop in the d.c. voltage developed across said terminals and applied to said regulator and (b) an increase in the direct current conducted by said terminals to said regulator, there being means for connecting the outputs of said power supply units to said common load and enabling the other of said power supply units to deliver power to said common load when said one of said power supply units is electrically disconnected from said source and the means for disconnecting said switching regulator from said d.c. source upon the concomitant occurrence of the two pre-selected conditions comprising: a thermal fuse, a resistor in heat transfer relationship to said fuse, a first transistor switch which can be turned off by simultaneously removing biases applied thereto from two different sources to increase the flow of current through said resistor and blow said fuse, a second transistor switching means which is turned off to remove one of said biases from said first transistor switching means upon said drop in d.c. voltage, and a third transistor switching means which is operated to remove said second bias upon said increase in current.

5. A d.c. power supply as defined in claim 4, wherein the means for operating the third transistor switching means to remove one of the biases from said first transistor switch includes a fourth transistor that is non-conducting as long as the input current to said switching regulator is below said pre-selected level and a fifth transistor that is biased into conduction as long as said fourth transistor remains in a non-conducting state, said fifth transistor being so connected to said first transistor switch that one of the biases required to keep said first transistor switch in a conducting state will be applied to said first transistor switch as long as said fifth transistor is conducting whereby, if said current increases to a level above said pre-selected level, said fourth transistor will be biased into conduction, said fifth transistor will become non-conducting, and said bias will be removed from said first transistor switch.

6. A d.c. power supply as defined in claim 4, which includes a zener diode in series with said second transistor switch, said zener diode being selected to become non-conducting at voltages below said pre-selected voltage whereby, if the input voltage drops below said preselected level, the supply of current to said second transistor switch will be interrupted, said second transistor switch will become non-conducting, and one of the two biases required to keep said first transistor switch in a conducting state will be removed therefrom.

7. A d.c. power supply as defined in claim 4 which includes a current limiting and voltage regulating means which is effective to keep transients appearing across said terminals from generating sufficient thermal output from said resistor to blow said thermal fuse.

8. A d.c. power supply as defined in claim 4 wherein the first of the transistor switches is connected in a current carrying parallel relationship with said resistor and is capable of conducting the bulk of the input current to said switching regulator when said transistor switch is in a conducting state.

* * * * *